United States Patent
Zhou

(10) Patent No.: US 6,690,838 B2
(45) Date of Patent: Feb. 10, 2004

(54) IMAGE PROCESSING CIRCUIT AND METHOD FOR REDUCING A DIFFERENCE BETWEEN PIXEL VALUES ACROSS AN IMAGE BOUNDARY

(75) Inventor: Qinggang Zhou, Seattle, WA (US)

(73) Assignee: Equator Technologies, Inc., Seattle, WA (US)

( * ) Notice: Subject to any disclaimer, the term of this patent is extended or adjusted under 35 U.S.C. 154(b) by 115 days.

(21) Appl. No.: 09/844,999

(22) Filed: Apr. 27, 2001

(65) Prior Publication Data

US 2001/0021276 A1 Sep. 13, 2001

Related U.S. Application Data

(63) Continuation of application No. 09/201,270, filed on Nov. 30, 1998, now Pat. No. 6,236,764.

(51) Int. Cl.[7] .................................................. G06K 9/36
(52) U.S. Cl. ...................................... 382/266; 382/199
(58) Field of Search ................................ 382/266–269, 382/199–200; 358/1.9

(56) References Cited

U.S. PATENT DOCUMENTS 5,337,088 A * 8/1994 Honjo ................... 375/240.24
6,236,764 B1 * 5/2001 Zhou .......................... 382/266

* cited by examiner

Primary Examiner—Thomas D. Lee
Assistant Examiner—Stephen Brinich
(74) Attorney, Agent, or Firm—Graybeal Jackson Haley LLP

(57) ABSTRACT

An image processing circuit includes a processor that receives at least a portion of an image including a boundary and first and second contiguous pixels disposed on opposite sides of the boundary, the first and second pixels having respective first and second pixel values. The processor generates a boundary value from the first and second pixel values, compares the boundary value to a comparison value, and reduces the difference between the first and second values if the boundary value has a specified relationship to the comparison value. For example, such a processing circuit can be used to reduce blockiness in an image that has undergone block-based digital compression.

36 Claims, 10 Drawing Sheets

FIG.6

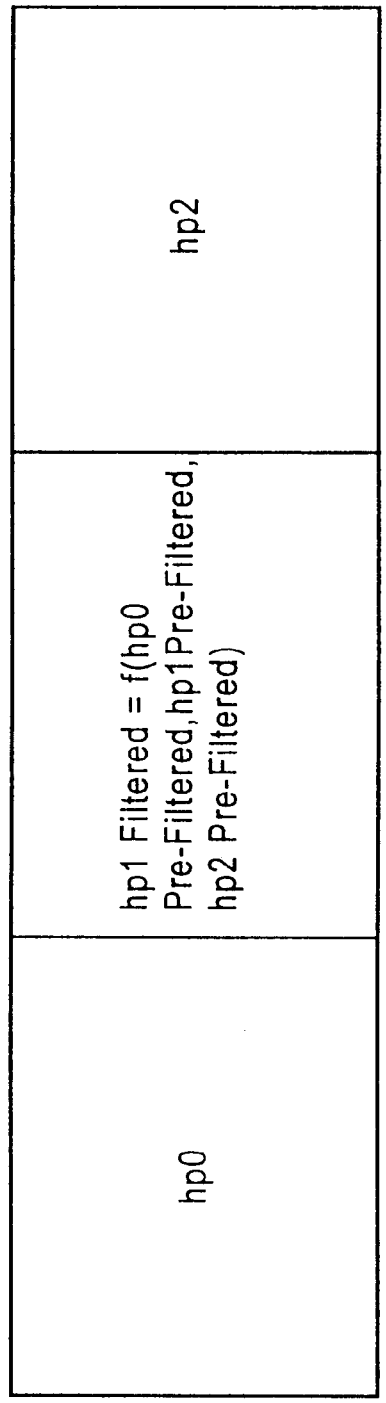

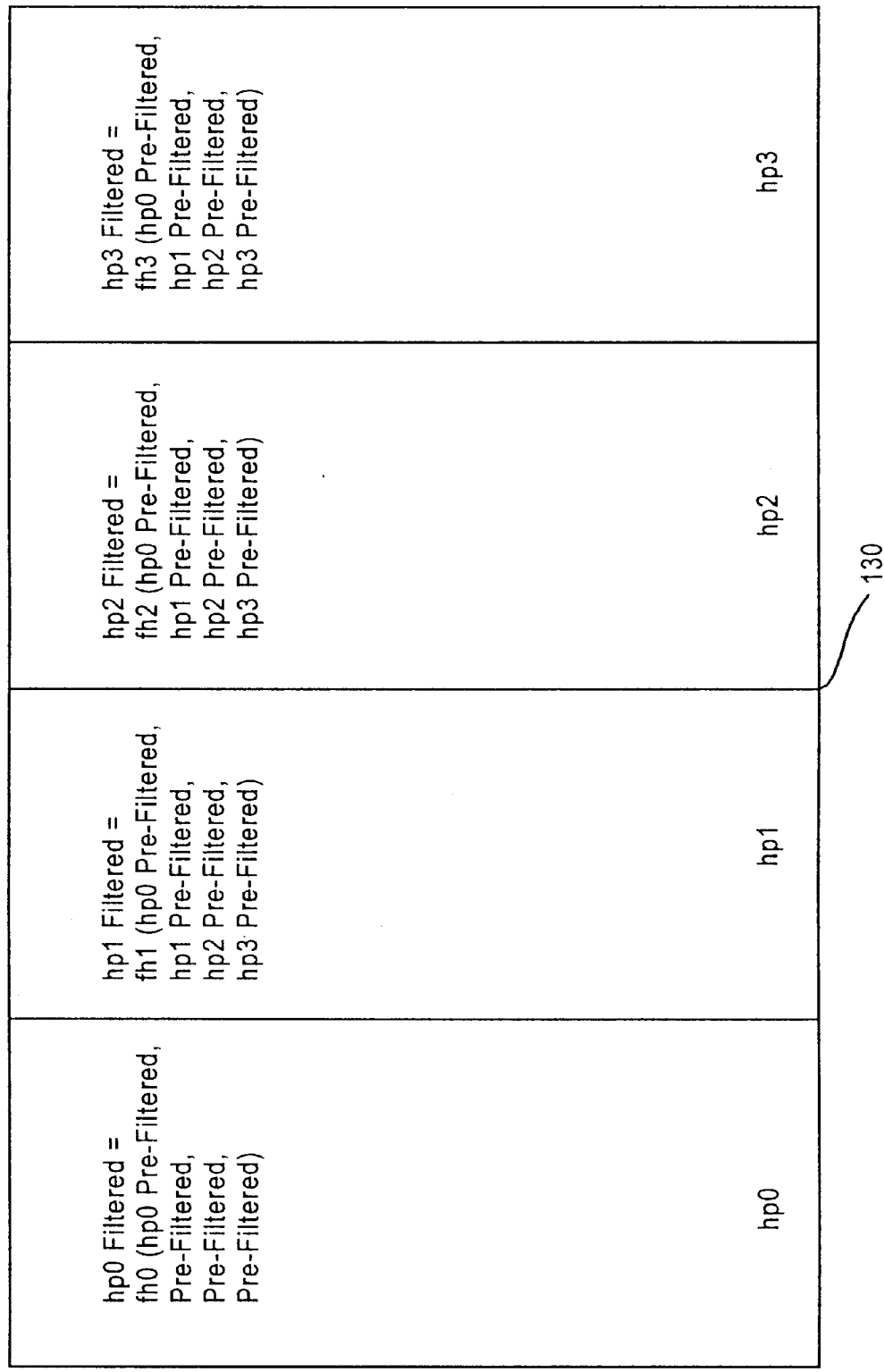

FIG.8B

| Vp0 filtered = fv0 (Vp0 pre-filtered , Vp1 pre-filtered , Vp2 pre-filtered , Vp3 pre-filtered ) |
| --- |
| Vp1 filtered = fv1 (Vp0 pre-filtered , Vp1 pre-filtered , Vp2 pre-filtered , Vp3 pre-filtered ) |
| Vp2 filtered = fv2 (Vp0 pre-filtered , Vp1 pre-filtered , Vp2 pre-filtered , Vp3 pre-filtered ) |
| Vp3 filtered = fv3 (Vp0 pre-filtered , Vp1 pre-filtered , Vp2 pre-filtered , Vp3 pre-filtered ) |

132

IMAGE PROCESSING CIRCUIT AND METHOD FOR REDUCING A DIFFERENCE BETWEEN PIXEL VALUES ACROSS AN IMAGE BOUNDARY

This is a continuation of prior application Ser. No. 09/201,270, filed Nov. 30, 1998, now U.S. Pat. No. 6,236,754 issued May 22, 2001, the benefit of the filing date of which is hereby claimed under 35 USC 120.

TECHNICAL FIELD

The invention relates generally to electronic and computer circuits, and more particularly to an image processing circuit and a method for reducing the difference between the respective values of a first pixel on one side of an image boundary and a second pixel on the other side of the boundary. For example, such a circuit and method can be used to reduce blockiness in an image that has undergone block-based digital compression.

BACKGROUND OF THE INVENTION

To electronically transmit a relatively high-resolution image over a relatively low-band-width channel, or to electronically store such an image in a relatively small memory space, it is often necessary to compress the digital data that represents the image. For example, High-Definition-Television (HDTV) video images are compressed to allow their transmission over existing television channels. Without compression, HDTV video images would require transmission channels having bandwidths much greater than the bandwidths of existing television channels. Furthermore, to reduce data traffic and transmission time to acceptable levels, an image may be compressed before being sent over the internet. Or, to increase the image-storage capacity of a CD-ROM or server, an image may be compressed before being stored thereon.

Such image compression typically involves reducing the number of data bits necessary to represent an image. Unfortunately, many compression techniques are lossy. That is, visual information contained in the original image may be lost during compression. This loss of information may cause noticeable differences, often called visual artifacts, in the reconstructed image. In many cases, these artifacts are undesirable, and thus significantly reduce the visual quality of the reconstructed image as compared to the quality of the original image.

Referring to FIGS. 1–3, the basics of the popular block-based Moving Pictures Experts Group (MPEG) compression standards, which include MPEG-1 and MPEG-2, are discussed. For purposes of illustration, the discussion is based on using an MPEG 4:2:0 format to compress images represented in a Y, $C_B$, $C_R$ color space, although the basic concepts discussed also apply to other MPEG formats and images represented in other color spaces, and to other block-based compression standards such as the Joint Photographic Experts Group (JPEG) standard, which is often used to compress still images. Furthermore, although many details of the MPEG standards and the Y, $C_B$, $C_R$ color space are omitted for brevity, these details are well-known and are disclosed in a large number of available references.

Referring to FIGS. 1–3, the MPEG standards are often used to compress temporal sequences of images—which are also called video frames—such as found in a television broadcast. Each video frame is divided into areas called macro blocks, which each include one or more pixels. FIG. 1A is a 16-pixel-by-16-pixel macro block 10 having 256 pixels 12. In the MPEG standards, a macro block is always 16×16 pixels, although other compression standards may use macro blocks having other dimensions. In the original video frame, i.e., the frame before compression, each pixel 12 has a respective luminance value Y and a respective pair of color-, i.e., chroma-, difference values $C_B$ and $C_R$.

Referring to FIGS. 1A–1D, before compression of the frame, the digital luminance (Y) and chroma-difference ($C_B$ and $C_R$) values that will be used for compression, i.e., the pre-compression values, are generated from the original Y, $C_B$, and $C_R$ values of the original frame. In the MPEG 4:2:0 format, the pre-compression Y values are the same as the original Y values. Thus, each pixel 12 merely retains its original luminance value Y. But to reduce the amount of data to be compressed, the MPEG 4:2:0 format allows only one pre-compression $C_B$ value and one pre-compression $C_R$ value for each group 14 of four pixels 12. Each of these pre-compression $C_B$ and $C_R$ values are respectively derived from the original $C_B$ and $C_R$ values of the four pixels 12 in the respective group 14. Thus, referring to FIGS. 1B–1D, the pre-compression Y, $C_B$, and $C_R$ values generated for the macro block 10 are arranged as one 16×16 matrix 16 of pre-compression Y values (equal to the original Y value for each pixel 12), one 8×8 matrix 18 of pre-compression $C_B$ values (equal to one derived $C_B$ value for each group 14 of four pixels 12), and one 8×8 matrix 20 of pre-compression $C_R$ values (equal to one derived $C_R$ value for each group 14 of four pixels 12). It is, however, common in the industry to call the matrices 16, 18, and 20 "blocks" of values. Furthermore, because it is convenient to perform the compression transforms on 8×8 blocks of pixel values instead of 16×16 blocks, the block 16 of pre-compression Y values is subdivided into four 8×8 blocks 22a–22d, which respectively correspond to the 8×8 blocks A–D of pixels in the macro block 10. Thus, still referring to FIGS. 1B–1D, six 8×8 blocks of pre-compression pixel data are generated for each macro block 10: four 8×8 blocks 22a–22d of pre-compression Y values, one 8×8 block 18 of pre-compression $C_B$ values, and one 8×8 block 20 of pre-compression $C_R$ values.

FIG. 2 is a general block diagram of an MPEG compressor 30, which is more commonly called an encoder 30. Generally, the encoder 30 converts the pre-compression data for a frame or sequence of frames into encoded data that represent the same frame or frames with significantly fewer data bits than the pre-compression data. To perform this conversion, the encoder 30 reduces or eliminates redundancies in the pre-compression data and reformats the remaining data using efficient transform and coding techniques.

More specifically, the encoder 30 includes a frame-reorder buffer 32, which receives the pre-compression data for a sequence of one or more frames and reorders the frames in an appropriate sequence for encoding. Thus, the reordered sequence is often different than the sequence in which the frames are generated. The encoder 30 assigns each of the stored frames to a respective group, called a Group Of Pictures (GOP), and labels each frame as either an intra (I) frame or a non-intra (non-I) frame. The encoder 30 always encodes an I-frame without reference to another frame, but can and often does encode a non-I frame with reference to one or more of the other frames in the GOP. The encoder 30 does not, however, encode a non-I frame with reference to a frame in a different GOP.

During the encoding of an I frame, the 8×8 blocks (FIGS. 1B–1D) of the pre-compression Y, $C_B$, and $C_R$ values that represent the I frame pass through a summer 34 to a Discrete Cosine Transform (DCT) circuit 36, which transforms these blocks of values into respective 8×8 blocks of one DC coefficient and sixty-three AC coefficients. That is, the summer 34 is not needed when the encoder 30 encodes an I frame, and thus the pre-compression values pass through the summer 34 without being summed with any other values. As discussed below, however, the summer 34 is often needed when the encoder 30 encodes a non-I frame. A quantizer 38 limits each of the coefficients to a respective maximum value, and provides the quantized AC (nonzero frequency) and DC (zero frequency) coefficients on respective paths 40 and 42. A predictive encoder 44 predictively encodes the DC coefficients, and a variable-length coder 46 converts the quantized AC coefficients and the quantized and predictively encoded DC coefficients into variable-length codes, such as Huffman codes. These codes form the encoded data that represent the pixel values of the encoded I frame. A transmit buffer 48 then temporarily stores these codes to allow synchronized transmission of the encoded data to a decoder (discussed below in conjunction with FIG. 3). Alternatively, if the encoded data is to be stored instead of transmitted, the coder 46 may provide the variable-length codes directly to a storage medium such as a CD-ROM.

If the I frame will be used as a reference (as it often will be) for one or more non-I frames in the GOP, then, for the following reasons, the encoder 30 generates a corresponding reference frame by decoding the encoded I frame with a decoding technique that is similar or identical to the decoding technique used by the decoder (FIG. 3). When decoding non-I frames that are referenced to the I frame, the decoder has no option but to use the decoded I frame as a reference frame. Because MPEG encoding and decoding are lossy, the pixel values of the decoded I frame will often be different than the pre-compression pixel values of the I frame. Therefore, using the pre-compression I frame as a reference frame during encoding may cause additional differences in the decoded non-I frame because the reference frame used for decoding (decoded I frame) would be different than the reference frame used for encoding (pre-compression I frame).

Therefore, to generate a reference frame for encoding that will be similar to or the same as the reference frame used for decoding, the encoder 30 includes a dequantizer 50 and an inverse DCT circuit 52, which are designed to mimic the dequantizer and inverse DCT circuit of the decoder (FIG. 3). The dequantizer 50 dequantizes the quantized DCT coefficients from the quantizer 38, and the circuit 52 transforms the dequantized DCT coefficients back into corresponding 8×8 blocks of Y, $C_B$, and $C_R$ pixel values. Because of the losses incurred during quantization and dequantization, however, some or all of these decoded pixel values may be respectively different than the corresponding pre-compression pixel values. These decoded pixel values then pass through a summer 54 (used when generating a reference frame from a non-I frame as discussed below) to a reference-frame buffer 56, which stores the reference frame.

During the encoding of a non-I frame, the encoder 30 initially encodes each macro-block of the non-I frame in at least two ways: in the manner discussed above for I frames, and using motion prediction, which is discussed below. The encoder 30 then saves and transmits the resulting code having the fewest bits. This technique insures that the macro blocks of the non-I frames are always encoded using the fewest bits.

With respect to motion prediction, an object in a frame exhibits motion if its relative position changes in the succeeding frames. For example, a horse exhibits relative motion if it gallops across the screen. Or, if the camera follows the horse, then the background exhibits relative motion. Generally, each of the succeeding frames in which the object appears contains at least some of the same macro blocks of pixels as the preceding frames. But such matching macro blocks in the succeeding frame often occupy respective frame locations that are different than the respective frame locations they occupy in the preceding frames. Alternatively, a macro block that includes a portion of a stationary object (e.g., tree) or background scene (e.g., sky) may occupy the same frame location in a succession of frames. In either case, instead of encoding each frame independently, it takes fewer data bits to say "locations X and Z of frame #1 (non-I frame) contain the same macro blocks that are in locations S and T, respectively, of frame #0 (I frame)." This "statement" is encoded as a motion vector. For a stationary or relatively slow-moving object or background scene, the motion vector is merely set near or equal to zero.

More specifically and still referring to FIG. 2, during the encoding of a non-I frame, a motion predictor 58 compares the pre-compression Y values (the $C_B$ and $C_R$ values are not used during motion prediction) of macro blocks in the non-I frame with the decoded Y values of macro blocks in the reference frame to identify matching macro blocks. For each macro block in the non-I frame for which a match is found in the reference frame, a motion predictor 58 generates a motion vector that specifies the location of the matching macro block in the reference frame. Thus, as discussed below in conjunction with FIG. 3, during decoding of these macro blocks of the non-I frame, the decoder uses the motion vectors to obtain the pixel values for these macro blocks from the matching macro blocks in the reference frame. The predictive encoder predictively encodes the motion vectors, and the coder 46 generates codes for the predictively encoded motion vectors and provides them to the transmit buffer 48.

Furthermore, because a macro block in the non-I frame and a matching macro block in the reference frame are often similar but not identical, the encoder 30 encodes these differences along the with motion vector so the decoder can account for them. More specifically, the motion predictor 58 provides the decoded Y values of the matching macro block of the reference frame to the summer 34, which effectively subtracts, on a pixel-by-pixel basis, these Y values from the pre-compression Y values of the matching macro block of the non-I frame. These differences, which are called residuals, are arranged in 8×8 blocks and are processed by the DCT circuit 36, the quantizer 38, the coder 46, and the buffer 48 in a manner similar to that discussed above, except that the quantized DC coefficients of the residual blocks are not predictively encoded by the predictive encoder 44.

Additionally, it is possible to use a non-I frame as a reference frame. When the non-I frame will be used as a reference frame, the quantized residuals from the quantizer 38 are respectively dequantized and inverse transformed by the dequantizer 50 and the inverse DCT circuit 52 so that this non-I reference frame will be the same as the one used by the decoder for the reasons discussed above. The motion predictor 58 provides the decoded Y values of the reference I frame from which the residuals were generated to the summer 54, which adds the respective residuals from the circuit 52 to these decoded Y values of the reference I frame to generate the respective Y values of the reference non-I frame. The reference-frame buffer 56 then stores the reference non-I frame along with the reference I frame for use in encoding subsequent non-I frames.

Still referring to FIG. 2, the encoder 30 also includes a rate controller 60 to insure that the transmit buffer 48, which typically transmits the encoded frame data at a fixed rate, never overflows or empties, i.e., underflows. If either of these conditions occurs, errors may be introduced into the encoded data. For example, if the buffer 48 overflows, data from the coder 46 is lost. Thus, the rate controller 60 uses feed back to adjust the quantization scaling factors used by the quantizer 38 based on the degree of fullness of the transmit buffer 48. The more full the buffer 48, the larger the controller 60 makes the scale factors, and the fewer data bits the quantizer 40 generates. Conversely, the more empty the buffer 48, the smaller the controller 60 makes the scale factors, and the more data bits the quantizer 40 generates. This continuous adjustment insures that the buffer 48 neither overflows nor underflows.

FIG. 3 is a block diagram of a conventional MPEG decompressor 60, which is more commonly called a decoder 60 and which can decode frames that are encoded by the encoder 30 of FIG. 2.

For I frames and macro blocks of non-I frames that are not motion predicted, a variable-length decoder 62 decodes the variable-length codes received from the encoder 30. A prediction decoder 64 decodes the predictively encoded DC coefficients, and a dequantizer 65, which is similar or identical to the dequantizer 50 of FIG. 2, dequantizes the decoded AC and DC coefficients. An inverse DCT circuit 66, which is similar or identical to the inverse DCT circuit 52 of FIG. 2, transforms the dequantized coefficients into pixel values. The decoded pixel values pass through a summer 68 (which is used during the decoding of motion-predicted macro blocks of non-I frames as discussed below) into a frame-reorder buffer 70, which stores the decoded frames and arranges them in a proper order for display on a video display unit 72. If the I frame is used as a reference frame, it is also stored in the reference-frame buffer 74.

For motion-predicted macro blocks of non-I frames, the decoder 62, dequantizer 65, and inverse DCT 66 process the residuals as discussed above. The prediction decoder 64 decodes the motion vectors, and a motion interpolator 76 provides to the summer 68 the pixel values from the macro blocks in the reference frame that the motion vectors point to. The summer 68 adds these reference pixel values to the residuals to generate the pixel values of the decoded macro blocks, and provides these decoded pixel values to the frame-reorder buffer 70. If the non-I frame is used as a reference frame, it is stored in the reference-frame buffer 74.

A more detailed discussion of the MPEG encoder 30 and decoder 60 of FIGS. 2 and 3, respectively, is available in many publications including "Video Compression" by Peter D. Symes, McGraw-Hill, 1998. Furthermore, there are other well-known block-based compression techniques for encoding and decoding images.

Referring to FIG. 1A, a problem with block-based compression techniques such as the MPEG standard is that the loss of visual information during compression may cause some or all of the respective boundaries between the 8×8 pixel blocks A–D and between contiguous macro blocks 10 to be noticeable to a viewer. More specifically, the compression losses may cause an abrupt change in the pixel values across a boundary, thus making the boundary visible. Such a visible boundary is often described as "blocky" or as exhibiting a "blocky" artifact, and the process of reducing the severity of blocky artifacts, i.e., making blocky boundaries invisible to a viewer, is often called deblocking.

Some references, including C. Reeve and J. S. Lim, "Reduction of Blocking Effects in Image Coding," Optical Engineering, Vol. 23, No. 1, Jan/Feb 1984, pp. 34–37, and, N. Ngan, D. W. Lin, and M. L. Liou, "Enhancement of Image Quality for Low Bit Rate Video Coding," IEEE Transactions on Circuits and Systems, Vol. 38, No. 10, October 1991, pp. 1221–1225, disclose deblocking techniques that are implemented during image encoding. But most images and video sources are encoded according to internationally agreed-upon compression standards such as MPEG, so altering the encoding algorithms is impractical if not impossible if one wishes to design an encoding system that complies with one or more of these standards.

Other references, including T. O'Rourke, R. Stevenson, "Improved Image Decompression for Reduced Transform Coding Artifacts," IEEE Transactions On Circuits And Systems For Video Technologies, Vol. 5, No. 6, December 1995, and Y. Yang et al, "Projection-Based Spatially Adaptive Reconstruction of Block-Transform Compressed Images," IEEE Transactions on Image Processing, Vol. 4, No. 7, July 1995, disclose deblocking techniques that are implemented during image decoding. For example, O'Rourke et al. describe a statistical discontinuity-preserved image model and a statistical image compression model, and a technique for generating maximum a posteriori (MAP) estimations of boundary pixels given based on these two models. O'Rourke then estimates the values of the boundary pixels by iteratively solving a convex constrained optimization problem. Similarly, the Yang reference assumes that changes in neighboring pixel values, i.e., the values of pixels on either side of a boundary, should be at a minimum, and then, like O'Rourke, proceeds to estimate the values of the boundary pixels by iteratively solving the convex constrained optimization problem. But such techniques often require too much computation time for implementation in a real-time system. Additionally, such techniques often operate on boundaries that are not blocky. Unfortunately, when such techniques are applied to boundaries that are not blocky, the quality of the image may be degraded because generally, the assumption made by such techniques is that the difference between a pixel and its neighboring pixels should be small. Although such an assumption is correct some of the time, it is frequently incorrect, particularly in areas of an image including object edges.

Still other references describe deblocking techniques that employ low-pass filters along the block boundaries. Unfortunately, such low-pass filtering may lead to blurring at the block boundaries. Some of these techniques, such as that described in Ramamurthi and A. Gersho, "Nonlinear Space-Variant Post-processing of Block Coded Images," IEEE Transactions on Acoustics, Speech, and Signal Processing, Vol. ASSP-34, No. 5 October 1986, pp. 1258–1268, attempt to avoid blurring the boundaries by estimating the values of the boundary pixels in the original image and then adaptively choosing different types of filters to preserve the sharpness of the boundaries in the original image. Unfortunately, accurately estimating original boundary values from a highly compressed image may be very difficult because the quality of the decoded image is often inadequate for accurate boundary-value estimation. Furthermore, like some of the techniques described above, these techniques often operate on all of the boundaries in an image whether they are blocky or not, and thus may unnecessarily degrade the quality of the image or may be too computationally intensive for many applications.

SUMMARY OF THE INVENTION

In one aspect of the invention, an image processing circuit includes a processor that receives a portion of an image that includes a boundary and first and second contiguous pixels disposed on opposite sides of the boundary, the first and second pixels having respective first and second pixel values. The processor generates a boundary value from the first and second pixel values, compares the boundary value to a comparison value, and reduces the difference between the first and second pixel values if the boundary value has a specified relationship to the comparison value.

Because such a processing circuit operates on an image after it has been decoded, it does not change the way an image is encoded or decoded, and thus is compatible with all block-based compression standards. Furthermore, the comparison value can be set so that the processing circuit operates only on blocky boundaries, and thus does not degrade boundaries that are not blocky. Additionally, the processing circuit can operate on a sequence of video frames in real time.

BRIEF DESCRIPTION OF THE DRAWINGS

FIG. 6 is a detailed view of a macro block having boundaries that the image processing circuit of FIG. 4 operates on.

FIG. 7A is a functional block diagram of an embodiment of a filter that reduces the differences in pixel values across vertical image boundaries according to the invention.

FIG. 8A is a functional block diagram of another embodiment of a filter that reduces the differences in pixel values across vertical image boundaries according to the invention.

FIG. 8B is a functional block diagram of another embodiment of a filter that reduces the differences in pixel values across horizontal image boundaries according to the invention.

DETAILED DESCRIPTION OF THE INVENTION

Figure 3:
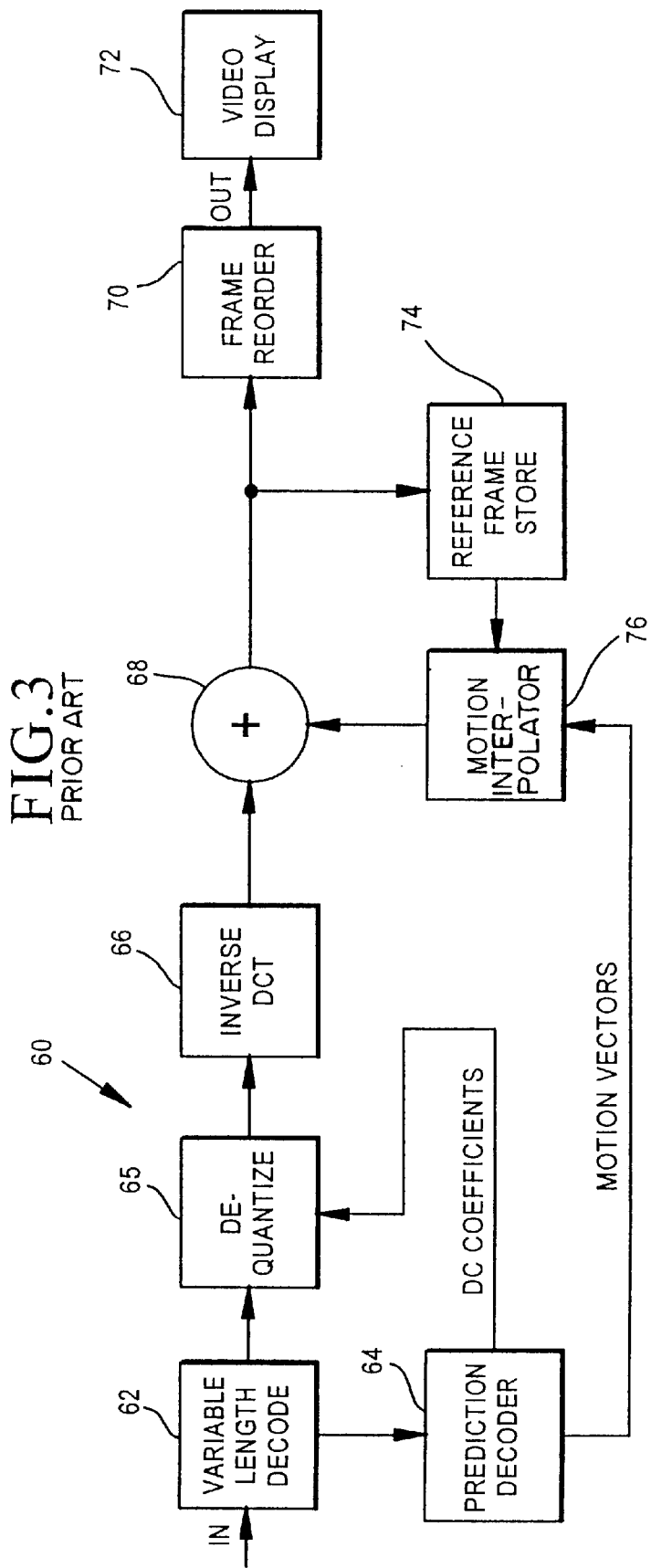
FIG. 3 is a block diagram of a conventional MPEG decoder.
Figure 4:
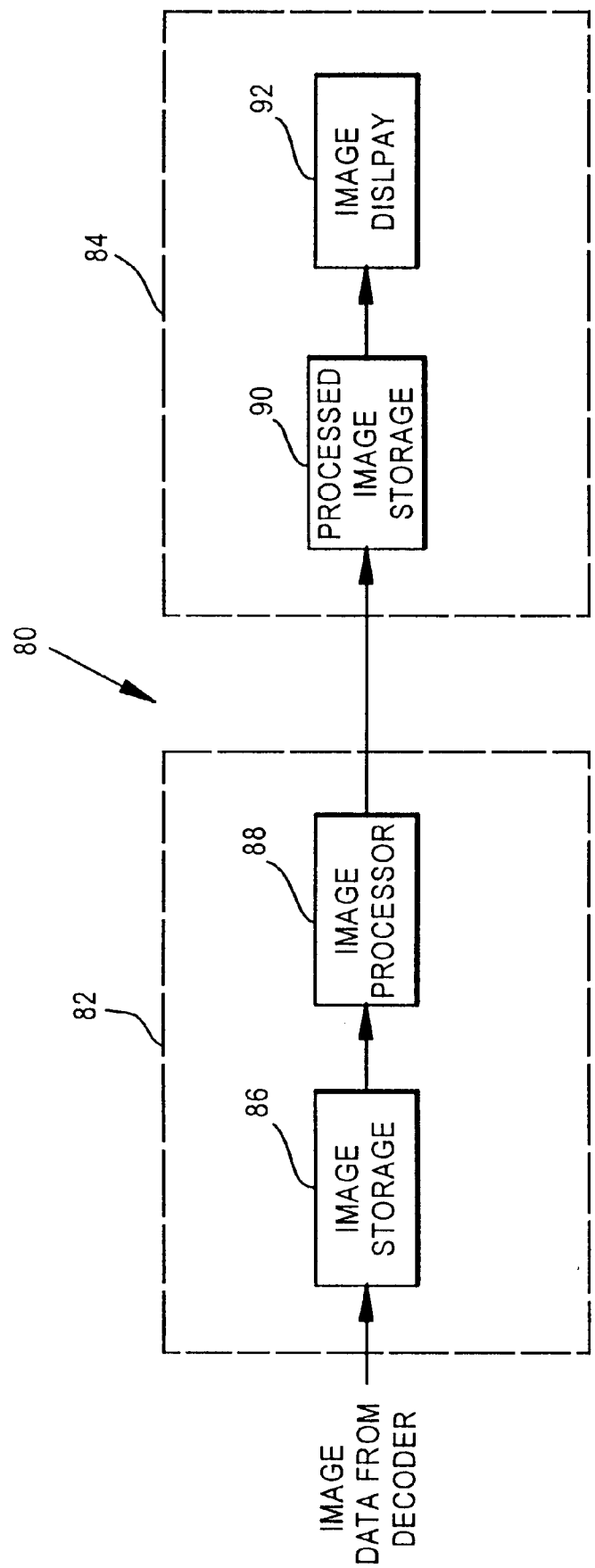
FIG. 4 is a schematic block diagram of an embodiment of an imaging processing circuit according to the invention.

FIG. 4 is a schematic block diagram of an image processing and display circuit 80, which includes an image processing circuit 82 and an image display circuit 84. The circuit 80 may be used to process and display individual images or a sequence of video frames. The image processing circuit 82 includes a conventional storage circuit 86 for storing image data received from a decoder such as the decoder 60 of FIG. 3. The circuit 82 also includes an image processor 88, which in one embodiment includes conventional hardware components (not shown) and which reduces the pixel differences across blocky image boundaries as discussed below. In one embodiment of the invention, the storage circuit 86 is part of the decoder. For example, the storage circuit 86 may be the frame-reorder buffer 70 of FIG. 3. In another embodiment, the storage circuit 86 is part of the processor 88. In yet another embodiment, the processing circuit 82 does not include the storage circuit 86, and the processor 88 receives the image data directly from the decoder. The display circuit 84 includes an image storage circuit 90, which stores the processed image data from the processor 88, and includes a display device 92, which displays the images stored in the circuit 90.

Figure 5:
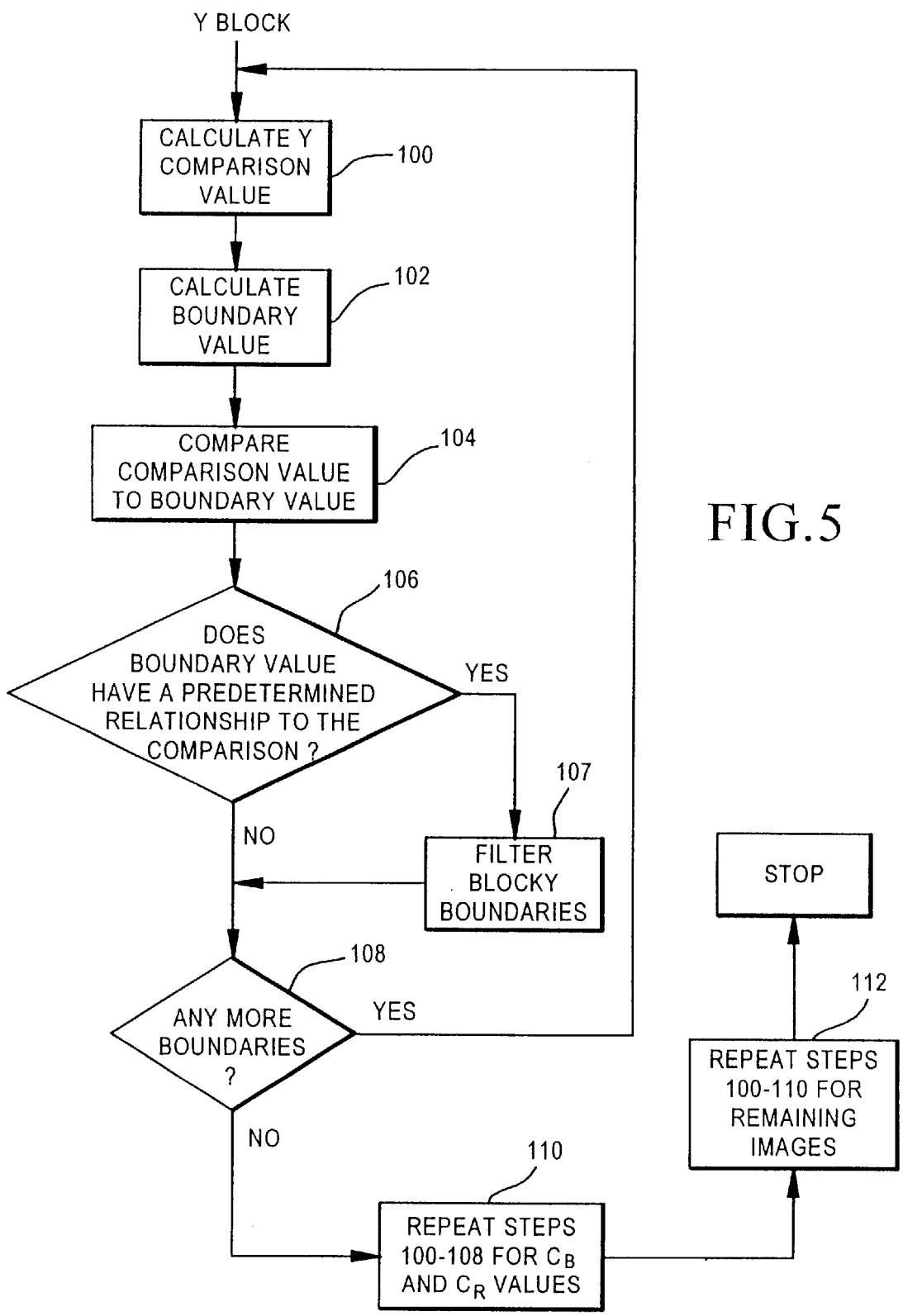
FIG. 5 is a flow chart that explains the operation of the image processing circuit of FIG. 4.

FIG. 5 is a flow chart that shows the general operation of one embodiment of the image processor 88 of FIG. 4. For example purposes, the operation of the processor 88 is discussed with respect to the pixel Y values, it being understood that the operation is the same for the pixel $C_B$ and $C_R$ values and for the luminance and chroma values of other color spaces.

In step 100, the processor 88 first calculates a threshold value based on the decoded values of some or all of the pixels in two contiguous pixel blocks that share a boundary. In one embodiment, the pixel blocks are 8×8, it being understood that the pixel blocks may have dimensions other than 8×8.

Next, in step 102, the processor 88 calculates a boundary value from the values of the pixels that lie along the boundary. Although the processor 88 is described as performing step 100 before step 102, the order of these steps can be reversed.

Then, in step 104, the processor 88 compares the threshold value to the boundary value.

In step 106, if the boundary value differs from the threshold value in a predetermined manner (e.g., is greater than, is less than), then the processor 88 identifies the boundary as blocky, and in step 107, filters the pixel values that lie along the boundary. In one embodiment, the processor 88 filters the pixel values by reducing the differences between the values of pixels on one side of the boundary and the values of pixels on the other side of the boundary. If the boundary value does not differ from the threshold value in the predetermined way (e.g., is not greater than, is not less than), then the processor 88 identifies the boundary as not blocky.

Referring to step 108, the processor 88 then processes all of the remaining boundaries of the image in this manner. In one embodiment, the processor 88 starts in the upper left corner of the image and works toward the lower right corner.

Referring to step 110, after the processor 88 processes all of the boundaries with respect to the Y values, the processor 88 repeats steps 100–108 for the $C_R$ and $C_B$ values.

Referring to step 112, after the processor 88 processes all the boundaries in the image with respect to the $C_B$ and $C_R$ values, the processor 88 repeats steps 100–110 for any remaining images.

Therefore, because the processor 88 operates on the boundaries of an image after the image has been decoded, the described de-blocking technique neither needs a change in nor makes a change to the techniques used to encode and decode the image, and thus is compatible with any block-based compression standard. Furthermore, as discussed below, because the calculations of the threshold and boundary values and the filtering algorithm are relatively simple, the processor 88 can operate on the boundaries fast enough for real-time applications such as the enhancement of HDTV video frames. Additionally, experimental observation of images compressed using standards such as ISO/ITU, MPEG, and H.263 indicates that a significant number of boundaries are not blocky, and that the decoded image is often of the best visual quality when these "unblocky" boundaries are left unaltered. Thus, because the processor 88 filters only the boundaries it identifies as blocky, it does not degrade the quality of the image by filtering the boundaries that are not blocky.

Figure 6:
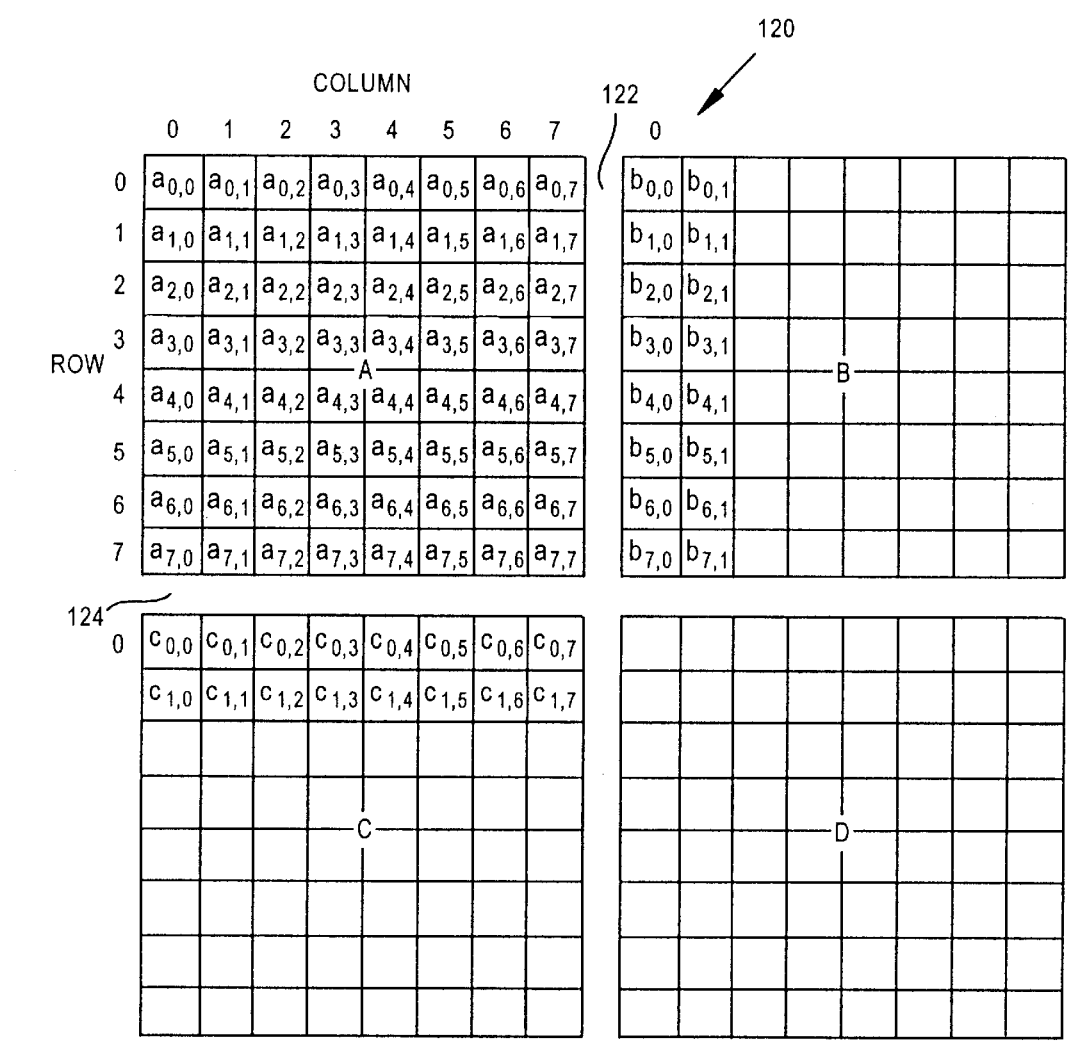
Figure 7B:
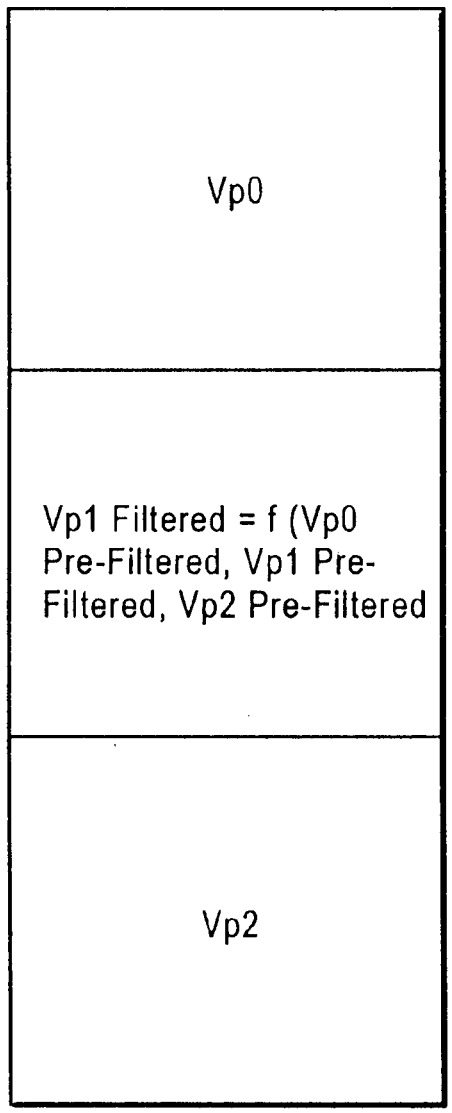
FIG. 7B is a functional block diagram of an embodiment of a filter that reduces the differences in pixel values across horizontal image boundaries according to the invention.

Referring to FIGS. 6, 7A, and 7B, the operation of the image processor 88 of FIG. 4 according to an embodiment of the invention is discussed. Generally, to determine whether or not a boundary between two contiguous pixel blocks is blocky, the processor 88 compares the respective average roughnesses inside the two blocks to the roughness at the boundary. That is, the boundary value (step 102 of FIG. 5) is a function of the roughness at the boundary between the two blocks, and the threshold value (step 104 FIG. 5) is a function of the respective average roughnesses inside the two blocks. If the processor 88 identifies a boundary as being blocky, then it implements the conventional finite-impulse-response (FIR) filters of FIGS. 7A and 7B to "smoothen" the differences between the values of the pixels that lie along and on opposite sides of the boundary. Thus, this embodiment exploits the experimental observation that in a typical real-world image before compression, the roughness within a particular block is the same as or is close to the respective roughnesses at its boundaries with adjacent blocks. But for reasons discussed above, lossy compression schemes may cause a block to have a different (typically higher) degree of roughness along its boundaries than within itself, and this difference in roughness is visible as a blocky boundary. Furthermore, although this embodiment is described below with respect to the Y values, it can be used with the $C_R$ and $C_B$ values and the luminance and chroma values of other color spaces.

FIG. 6 is a 16×16 macro block 120, which includes four 8×8 pixel blocks A–D. Although shown in more detail, the macro block 120 and the blocks A–D are similar to the macro block 10 and the blocks A–D of FIG. 1A. Each of the pixels in the respective blocks A–D has a respective row and column location. For example, the pixel $a_{2,4}$ in the block A is located at the intersection of row 2 and column 4 of the block A. A similar coordinate scheme is used for the blocks B–D. Furthermore, four boundaries are respectively located between the blocks A–D. For example, a boundary 122 is located between the blocks A and B, and a boundary 124 is located between the blocks A and C. The widths of the boundaries 122 and 124 are exaggerated for illustration, but in actuality, the pixels in column 7 of block A are contiguous with the respective pixels in column 0 of block B, and the pixels in row 7 of block A are contiguous with the respective pixels in row 0 of block C. For example, referring to the boundary 122, the pixel $a_{0,7}$ is contiguous with the pixel $b_{0,0}$, the pixel $a_{1,7}$ is contiguous with the pixel $b_{1,0}$, and so on.

Figure 1:
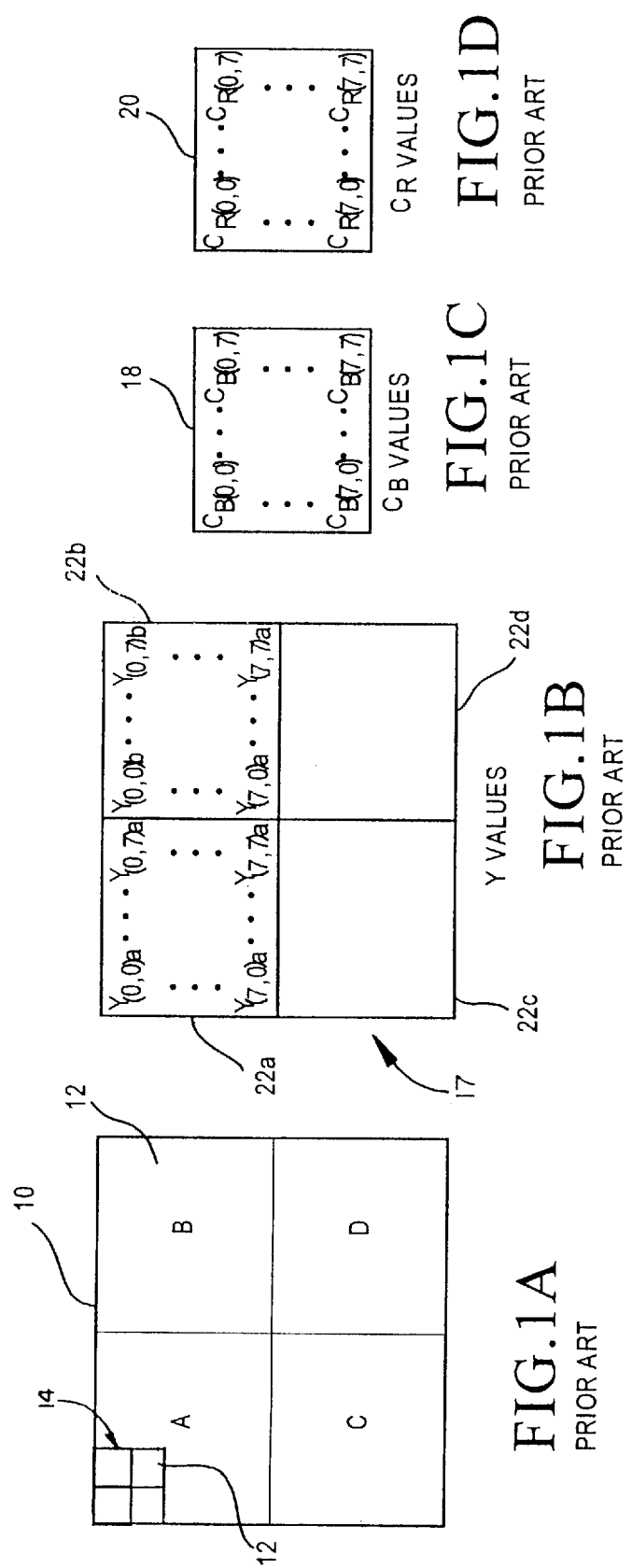
FIG. 1A is a conventional macro block of pixels in an image.
FIG. 1B is a conventional block of pre-compression Y values that respectively correspond to the pixels in the macro block of FIG. 1A.
FIG. 1C is a conventional block of pre-compression $C_B$ values that respectively correspond to the pixel groups in the macro block of FIG. 1A.
FIG. 1D is a conventional block of pre-compression $C_R$ values that respectively correspond to the pixel groups in the macro block of FIG. 1A.
Figure 2:
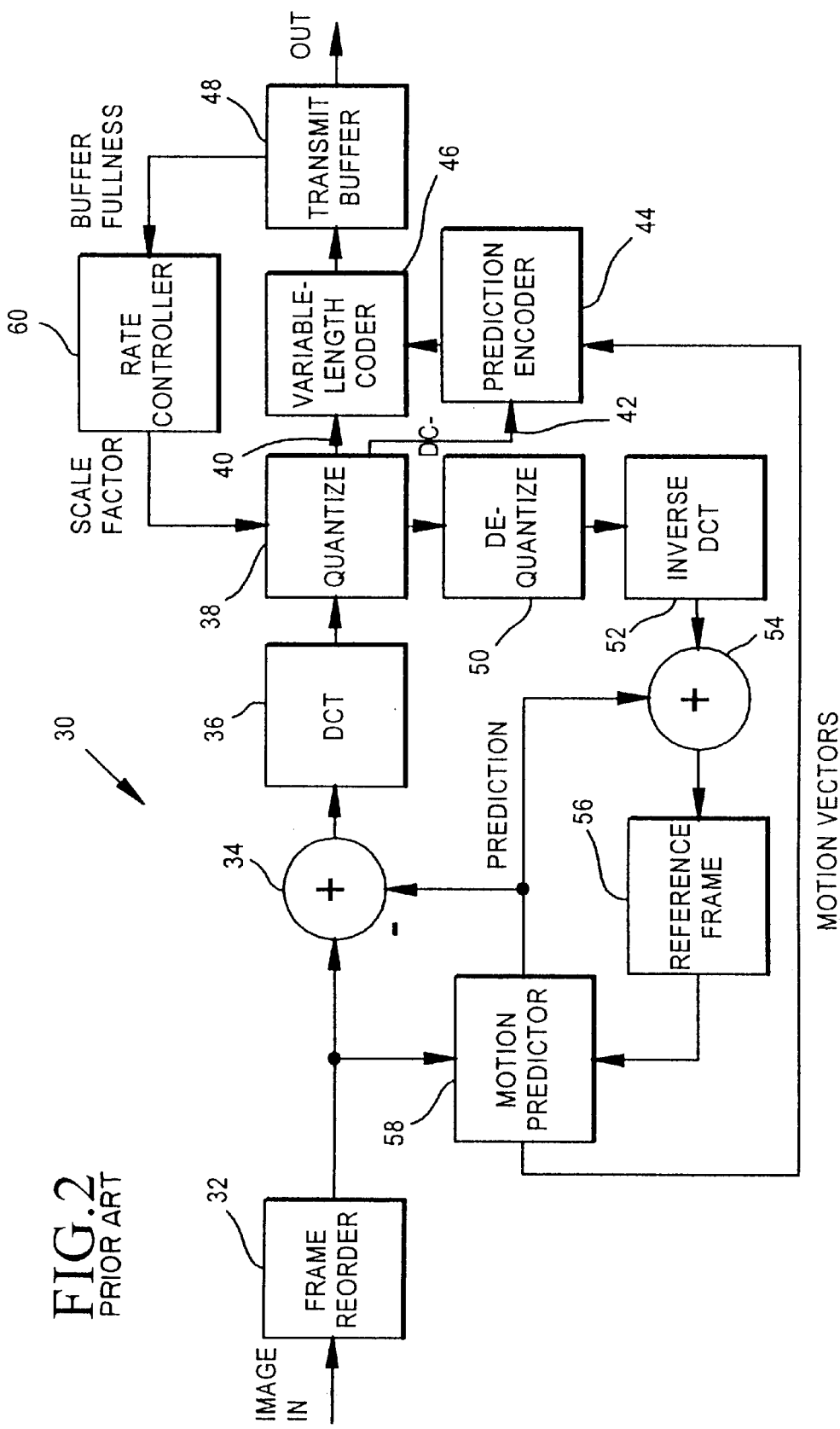
FIG. 2 is a block diagram of a conventional MPEG encoder.

As discussed in conjunction with FIGS. 1–3, because the DCT transform is performed on 8×8 blocks of pixel values, the macro block 120 is divided into the 8×8 blocks A–D. Therefore, for example purposes, the processor 88 is described as operating on the internal boundaries between the blocks A–D with respect to the Y values, it being understood that the processor 88 operates on the external boundaries between macro blocks with respect to the Y values in a similar fashion. But because in the MPEG 4:2:0 format each macro block has associated therewith only one 8×8 block of $C_R$ values and one 8×8 block of $C_B$ values, there are no chroma-difference boundaries within a macro block, and thus the processor 88 operates only on the boundaries between macro blocks with respect to the $C_R$ and $C_B$ values. The processor 88, however, operates on these boundaries with respect to the $C_R$ and $C_B$ values in a manner similar to that described below for the Y values. In other formats, however, there may be chroma-difference boundaries within a macro block, in which case the processor 88 operates on these boundaries too. Furthermore, although the macro block 120 is described as being 16×16 and the blocks A–D are described as being 8×8, the macro block 120 and the blocks A–D may have other dimensions.

Still referring to FIG. 6, the operation of the processor 88 according to this embodiment of the invention is discussed in detail. For example purposes, the operation with respect to the boundaries 122 and 124 and the Y values is discussed, it being understood that the operation is similar with respect to other boundaries—whether between the blocks A–D within a macro block 120 or between contiguous macro blocks 120—or with respect to the $C_R$ and $C_B$ values. Furthermore, the term "block" as used below is generic to blocks like the blocks A–D and to macro blocks.

In this embodiment, the horizontal roughness of a block with respect to the Y values equals the average horizontal difference between the Y values of horizontally adjacent pixels within the block. (Similarly, for the 4:2:0 MPEG format discussed in conjunction with FIGS. 1–3, the horizontal roughnesses with respect to the $C_R$ and $C_B$ values equal the average horizontal differences between the $C_R$ and $C_B$ values, respectively, of adjacent pixel groups, like the groups 14 of FIG. 1A, within the block.) Likewise, the vertical roughness of a block with respect to the Y values is equal to the average vertical difference between the Y values of vertically adjacent pixels within the block. (Similarly, for the 4:2:0 MPEG format discussed in conjunction with FIGS. 1–3, the vertical roughnesses with respect to the $C_R$ and $C_B$ values equal the average vertical differences between the $C_R$ and $C_B$ values, respectively, of adjacent pixel groups.) For example, the respective horizontal roughnesses $R_{Ah}$ and $R_{Bh}$ of the blocks A and B of FIG. 6, respectively, are represented by the following formulas:

$$R_{Ah} = \frac{1}{56} \sum_{y=0}^{7} \sum_{x=1}^{7} |a_{y,x} - a_{y,x-1}| \tag{1}$$

$$R_{Bh} = \frac{1}{56} \sum_{y=0}^{7} \sum_{x=1}^{7} |b_{y,x} - b_{y,x-1}| \tag{2}$$

where $a_{y,x}$ is the Y value of the pixel in row y and column x of block A, and $b_{y,x}$ is the Y value of the pixel in row y and column x of block B.

Similarly, the vertical roughnesses $R_{Av}$ and $R_{Cv}$ of the blocks A and C, respectively, are represented by the following formulas:

$$R_{AV} = \frac{1}{56} \sum_{y=1}^{7} \sum_{x=0}^{7} |a_{y-1,x} - a_{y,x}| \tag{3}$$

$$R_{Cv} = \frac{1}{56} \sum_{y=1}^{7} \sum_{x=0}^{7} |c_{y-1,x} - c_{y,x}| \tag{4}$$

where $c_{y,x}$ is the Y value of the pixel in the row y and column x of the block C.

Furthermore, the horizontal boundary roughness $R_{AB}$ of the boundary 122 between the blocks A and B is represented by the following formula:

$$R_{AB} = \frac{1}{8}\sum_{y=0}^{7}|a_{y,7} - b_{y,0}| \tag{5}$$

Thus, $R_{AB}$ equals the average difference between the Y values of the respective pairs of contiguous pixels in column 7 of block A and column 0 of block B.

Likewise, the vertical boundary roughness $R_{AC}$ of the boundary 124 between the blocks A and C is represented by the following formula:

$$R_{AC} = \frac{1}{8}\sum_{x=0}^{7}|a_{7,x} - c_{0,x}| \tag{6}$$

Thus, $R_{AC}$ equals the average difference between the Y values of the respective pairs of contiguous pixels in row 7 of block A and row 0 of block C.

It has been experimentally determined that the horizontal boundary 122 is blocky if the horizontal boundary roughness $R_{AB}$ exceeds the average of the horizontal roughnesses $R_{Ah}$ and $R_{Bh}$ by a first predetermined amount, and that the boundary 124 is blocky if the vertical boundary roughness $R_{AC}$ exceeds the average of the vertical roughnesses $R_{Av}$ and $R_{Cv}$ by a second predetermined amount. To carry out this calculation, the processor 88 calculates the average Y values $P_A$, $P_B$, $P_C$ for the pixels in blocks A, B, and C, respectively, according to the following formulas:

$$P_A = \frac{1}{64}\sum_{y=0}^{7}\sum_{x=0}^{7}a_{y,x} \tag{7}$$

$$P_B = \frac{1}{64}\sum_{y=0}^{7}\sum_{x=0}^{7}b_{y,x} \tag{8}$$

$$P_C = \frac{1}{64}\sum_{y=0}^{7}\sum_{x=0}^{7}c_{y,x} \tag{9}$$

The processor 88 identifies the boundary 122 between the blocks A and B as blocky when the following equation is true:

$$\frac{R_{AB}}{P_A + P_B} - \frac{\frac{1}{2}(R_{Ah} + R_{Bh})}{P_A + P_B} > \frac{T_h}{2} \tag{10}$$

where $T_h$ is an experimentally determined threshold constant. In one aspect of this embodiment, $T_h \cong 0.05$. More specifically, because the human visual system is more sensitive to differences in roughness than the to the actual degree of roughness, the processor 88 filters the boundary 122 only if the average of the horizontal roughnesses $R_{Ah}$ and $R_{Bh}$ differs from the average of the horizontal-boundary roughness $R_{AB}$ by more than $T_h$ divided by 2. The equation 10 can be rewritten as:

$$R_{AB} - \frac{1}{2}(R_{Ah} + R_{Bh}) > \frac{T_h}{2}(P_A + P_B) \tag{11}$$

$$R_{AB} - \frac{1}{2}(R_{Ah} + R_{Bh}) > \frac{T_h}{2}(P_A + P_B) \tag{11}$$

It is convenient to rewrite the equation again so that one can compare a boundary value, here the boundary roughness $R_{AB}$, to a comparison value $M_{AB}$ to determine whether or not the boundary 122 is blocky. In this embodiment, $M_{AB}$ is calculated from equation (11) as:

$$M_{AB} = \frac{1}{2}[(R_{Ah} + R_{Bh}) + T_h(P_A + P_B)] \tag{12}$$

Therefore, in this embodiment, the boundary 122 is blocky if:

$$R_{AB} > \frac{1}{2}[(R_{Ah} + R_{Bh}) + T_h(P_A + P_B) \tag{13}$$

Thus, the processor 88 identifies the boundary 122 as being blocky and filters this boundary as discussed below only if the boundary value, here the horizontal-boundary roughness $R_{AB}$, is greater than the comparison value, $M_{AB}$.

Similarly, the processor 88 identifies the boundary 124 between the blocks A and C as blocky and filters this boundary when the following equation is true:

$$R_{AC} - \frac{1}{2}(R_{Av} + R_{Cv}) > \frac{T_h}{2}(P_A + P_C) \tag{14}$$

where $T_v$ is an experimentally determined vertical threshold constant. In one aspect of this embodiment, $T_v \cong 0.04$.

As with equation (11), it is convenient to rewrite equation (15) again so that one can compare a boundary value, here the boundary roughness $R_{AC}$, to a comparison value $M_{AC}$ to determine whether or not the boundary 124 is blocky. In this embodiment, $M_{AC}$ is calculated from equation (14) as:

$$M_{AC} = \frac{1}{2}[(R_{Av} + R_{Cv}) + T_v(P_A + P_C)] \tag{15}$$

Therefore, in this embodiment, the boundary 124 is blocky if:

$$R_{AC} > \frac{1}{2}[(R_{AV} + R_{Cv}) + T_v(P_A + P_C)] \tag{16}$$

Although in this embodiment the respective boundary values $R_{AB}$ and $R_{AC}$ and comparison values $M_{AB}$ and $M_{AC}$ are functions of the Y pixel values in two adjacent blocks of the same image, in other embodiments these values may be functions of other data such as the pixel values in nonadjacent blocks in the same frame, pixel values in blocks of other frames in a video sequence, motion-vector values, or transform-domain values such as DCT coefficients.

Next, to reduce the undesirable effects that blocky boundaries have on an image, the processor 88 implements a filter, such as a FIR filter, to smoothen the boundaries that are identified as being blocky. In this embodiment, the filter operates on the Y values of the pixels that are contiguous with the blocky boundary. For example, if the processor 88 identifies the boundary 122 as being blocky, then it filters the Y values of the 16 pixels—the eight pixels in column 7 of block A and the eight pixels in column 0 of block B—that are contiguous with the boundary 122. Likewise, if the processor 88 identifies the boundary 124 as being blocky, then it filters the Y values of the 16 pixels—the eight pixels in row 7 of block A and the eight pixels in row 0 of block C—that are contiguous with the boundary 124.

More specifically, referring to FIGS. 7A and 7B, in this embodiment, the processor 88 implements a filter that sets the Y value of a filtered pixel equal to a function of its Y value and the Y values of the two contiguous pixels on either side of the filtered pixel in a direction perpendicular to the boundary.

Referring to FIG. 7A, for a horizontal boundary such as the boundary 122, the Y value of the filtered pixel hp1 is set equal to a function of its Y value and the Y values of the two horizontally contiguous pixels hp0 and hp2. For example, to filter the Y value of a boundary pixel $a_{3,7}$ (hp1), the processor 88 sets the Y value of the pixel $a_{3,7}$ equal to a function of the Y values of the pixels $a_{3,6}$ (hp0), $a_{3,7}$ (hp1), and $b_{3,0}$ (hp2). The processor 88 then filters the Y values of all of the other pixels in column 7 of block A and column 0 of block B in a similar manner to effectively reduce the respective differences between the Y values of the pixels in column 7 of block A and the Y values of the respective pixels in column 0 of block B. That is, the processor 88 smoothens the boundary 122 by reducing the average difference between the Y values of the pixels $a_{7,0} \ldots a_{7,7}$ and the Y values of the respective pixels $b_{0,0} \ldots b_{0,7}$.

Similarly, referring to FIG. 7B, for a vertical boundary such as the boundary 124, the Y value of the filtered pixel vp1 is set equal to a function of its Y value and the Y values of the two vertically contiguous pixels vp0 and vp2. For example, to filter the Y value of a boundary pixel $c_{0,4}$ (vp1), the processor 88 sets the Y value of the pixel $c_{0,4}$ equal to a function of the Y values of the pixels $a_{7,4}$, (vp0), $c_{0,4}$, (vp1), and $c_{1,4}$, (vp2). The processor 88 then filters the Y values of all of the other pixels in row 7 of block A and row 0 of block C in a similar manner to effectively reduce the respective differences between the Y values of the pixels in row 7 of block A and the Y values of the respective pixels in row 0 of block C. That is, the processor 88 smoothens the boundary 124 by reducing the average difference between the Y values of the pixels $a_{0,7} \ldots a_{7,7}$ and the Y values of the respective pixels $c_{0,0} \ldots c_{0,7}$.

In one aspect of this embodiment, the processor implements an averaging filter that sets the Y value of the filtered pixel equal to the average of its pre-filtered Y value and the Y values of the contiguous pixels. For example, in this embodiment, referring to FIGS. 7A and 7B, $hp1_{filtered}=(hp0_{pre-filtered}+hp1_{pre-filtered}+hp2_{pre-filtered})/3$ and $vp1_{filtered}=(vp0_{pre-filtered}+vp1_{pre-filtered}+vp2_{pre-filtered})/3$. As discussed below, the processor 88 uses the pre-filtered Y values of the pixels it filters to avoid reaching a result that depends on the order in which the blocks are filtered. Consequently, after the processor 88 filters contiguous pixels on either side of a boundary, neither pixel has a filtered Y value equal to the average of the filtered Y values of the pixels next to it.

For example, referring to FIGS. 6 and 7A, the filtering of the Y values of the pixel $a_{3,7}$ and the horizontally adjoining pixel $b_{3,0}$ is described in conjunction with the smoothing of the boundary 122 according to an embodiment of the invention. First, the processor 88 calculates the average Y value for the pixels $a_{3,6}$, $a_{3,7}$, and $b_{3,0}$ (hp0, hp1, and hp2). Then, the processor 88 stores this resulting filtered Y value for $a_{3,7}$ in a temporary memory location such as in an on-board memory array. Next, using the pre-filtered value of $a_{3,7}$, the processor 88 sets the Y value of the pixel $b_{3,0}$ (hp1) equal to the average Y value for the pixels $a_{3,7}$, $b_{3,0}$, and $b_{3,1}$ (hp0, hp1, and hp2) and stores the resulting filtered Y value for $b_{3,0}$ in another temporary memory location. Then, the processor 88 puts the filtered Y values for $a_{3,7}$ and $b_{3,0}$ in the respective memory locations corresponding to the Y values of these pixels. As stated above, by using the pre-filtered Y values in all filtering calculations, the order of filtering, i.e., filtering a pixel in block A before filtering a horizontally contiguous pixel in block B or vice-versa, has no affect on the result of the filtering. Thus, the pixels $a_{0,7}$–$a_{7,7}$ and $b_{0,0}$–$b_{7,0}$ can be filtered in any order. Also, because the pre-filtered Y values of $a_{3,7}$ and $b_{3,0}$, and not the filtered Y values of $a_{3,7}$ and $b_{3,0}$, are used during the filtering of $a_{3,7}$, the filtered Y value of $a_{3,7}$ is not equal to the average of the Y value of $a_{3,6}$ and the filtered Y values of $a_{3,7}$ and $b_{3,0}$, which Y values appear in the decoded image after deblocking. Likewise, the filtered Y value of $b_{3,0}$ is not equal to the average of the Y value of $b_{3,1}$ and the filtered Y values of $a_{3,7}$ and $b_{3,0}$.

Similarly, referring to FIGS. 6 and 7B, the filtering of the Y values of the pixel $a_{7,3}$ and the vertically adjoining pixel $c_{0,3}$ is discussed in conjunction with the smoothing of the boundary 124 according to an embodiment of the invention. First, the processor 88 calculates the average pixel value for the pixels $a_{6,3}$, $a_{7,3}$, and $c_{0,3}$ (vp0, vp1, and vp2). Then, the processor 88 stores this resulting filtered pixel value for $a_{7,3}$ in a temporary memory location. Next, using the pre-filtered pixel value of the pixel $a_{7,3}$, the processor 88 sets the value of the pixel $c_{0,3}$ (vp1) equal to the average pixel value for the pixels $a_{7,3}$, $c_{0,3}$, and $c_{1,3}$ (vp0, vp1, and vp2). Therefore, for the reasons stated above, this embodiment allows the processor 88 to filter the pixels $a_{7,0}$–$a_{7,7}$ and $c_{0,0}$–$c_{0,7}$ in any order. Also, the filtered value of $a_{7,3}$ is not equal to the average of the value of $a_{6,3}$ and the filtered values of $a_{7,3}$ and $c_{0,3}$, and the filtered value of $c_{0,3}$ is not equal to the average of the value of $c_{1,3}$ and the filtered values of $a_{7,3}$ and $c_{0,3}$.

Referring to FIGS. 6, 8A, and 8B, in another embodiment of the invention, the processor 88 uses different roughness and filtering calculations to respectively identify and smoothen blocky boundaries. One difference between this embodiment and the previous embodiment discussed above in conjunction with FIGS. 7A and 7B is that in this embodiment, the processor 88 is often better able to distinguish between a sharp edge of an object and a blocky boundary. Furthermore, like the previous embodiment, although this embodiment is discussed with respect to the Y values and the boundaries within a macro block, the processor 88 operates on the $C_R$ and $C_B$ values and the boundaries between contiguous macro blocks in a similar manner.

In this embodiment, the processor 88 implements a minimum filter to determine the degree of blockiness at the block boundaries. The minimum filter removes the part of the roughness value that does not result from compression quantization errors. For example, the horizontal roughness $R_{AB}$ at the boundary 122 is represented by the following equation:

$$R_{AB} = \frac{1}{8}\sum_{y=0}^{7} \text{MIN}(|a_{y,7} - b_{y,0}|, T_{qe}) \qquad (17)$$

That is, an element y=i of the summation equals the smaller of the absolute value of $a_{y,7}$–$b_{y,0}$ (the Y values of the pixels $a_{y,7}$ and $b_{y,0}$, respectively) and $T_{qe}$, which is either an experimentally determined constant or an adaptive variable related to the quantization coefficients used during the encoding of the image. For example, if $T_{qe}$ is a constant, then $T_{qe}$=30 has been found to give good results. Alternatively, if it is an adaptive variable, then $T_{qe}$ is determined according to the possible quantization errors. More specifically, it has been discovered that a major cause of blocky boundaries is the errors resulting from quantization of the first few coefficients of the DCT transform. As discussed above in conjunction with FIG. 2, the quantization circuit 38 quantizes the coefficients from the DCT circuit 36 to reduce the number of data bits needed to encode a particular pixel block. The quantization circuit 38 applies a respective quantization value to each of the DCT coefficients representing a pixel block. In some applications, the quantizer 38 varies the quantization values from block to block depending on characteristics such as the degree of visual detail in a particular block. In other applications, the quantization values are fixed. Therefore, $T_{qe}$ is a function of the first three quantization values for each of the two blocks that are contiguous with the boundary in question, and in one aspect of this embodiment $T_{qe}$ is represented by the following equation:

$$T_{qe} = \frac{q_{A0} + q_{A1} + q_{A2} + q_{B0} + q_{B1} + q_{B2}}{2} \tag{18}$$

where $q_{A0}$–$q_{A2}$ and $q_{B0}$–$q_{B2}$ are the first three quantization values used during the encoding of blocks A and B, respectively.

In a similar manner, the vertical roughness $R_{AC}$ at the boundary 124 is represented by the following equation:

$$R_{AC} = \frac{1}{8}\sum_{x=0}^{7} \text{MIN}(|a_{7,x} - c_{0,x}|, T_{qe}) \tag{19}$$

Here, $T_{qe}$ is also either a constant or can be represented by the following equation:

$$T_{qe} = \frac{q_{A0} + q_{A1} + q_{A2} + q_{C0} + q_{C1} + q_{C2}}{2} \tag{20}$$

where $q_{C0}$–$q_{C2}$ are the first three quantization values used during the encoding of block C.

The processor 88 also calculates the horizontal and vertical roughnesses within a block in a different manner. In the previous embodiment, to identify a blocky boundary, the processor 88 calculates the horizontal and vertical roughnesses within a block by respectively averaging the horizontal and vertical differences between the values of all the horizontally and vertically contiguous pixels within the block. But in this embodiment, instead of computing the average horizontal and vertical differences for the values of every pixel in the block, the processor 88 computes these average differences only for values of the two alignments (either rows or columns) of pixels adjacent to the block boundary. Accordingly, the horizontal roughness $R_{Ah}$ of the block A is represented by the following equation:

$$R_{Ah} = \frac{1}{8}\sum_{y=0}^{7} |a_{y,6} - a_{y,7}| \tag{21}$$

Thus, the calculation of $R_{Ah}$ is simplified by taking the average of the absolute values of the differences between the Y values of the horizontally contiguous pixels in the last two columns 6 and 7 of block A.

In a similar manner, the horizontal roughness $R_{Bh}$ of block B is represented by the following equation:

$$R_{Bh} = \frac{1}{8}\sum_{y=0}^{7} |b_{y,0} - b_{y,1}| \tag{22}$$

Thus, the calculation of $R_{Bh}$ is simplified by taking the average of the absolute values of the differences between the Y values of the horizontally contiguous pixels in the first two columns 0 and 1 of block B.

Similarly, the vertical roughnesses $R_{Av}$ and $R_{Cv}$ of the blocks A and C, respectively, are represented by the following equations:

$$R_{Av} = \frac{1}{8}\sum_{x=0}^{7} |a_{6,x} - a_{7,x}| \tag{23}$$

$$R_{Cr} = \frac{1}{8}\sum_{x=0}^{7} |c_{0,x} - c_{1,x}| \tag{24}$$

The processor 88 identifies the boundary 122 as being blocky if the following equation is true:

$$R_{AB} > F \cdot \text{MAX}(R_{Ah}, R_{Bh}) + T_{bd} \tag{25}$$

Therefore, in this embodiment, the comparison value $M_{AB}$ is equal to the right-hand side of equation (25). Furthermore, F and $T_{bd}$ are determined experimentally, and MAX($R_{Ah}$, $R_{Bh}$) equals the greater of $R_{Ah}$ and $R_{Bh}$. For example, F=1.4 and $T_{bd}$=8 have been found to yield good results, although different values may be used.

Likewise, the processor 88 identifies the boundary 124 as being blocky if the following equation is true:

$$R_{AC} > F \cdot \text{MAX}(R_{Av}, R_{Cv}) + T_{bd} \tag{26}$$

Here, the comparison value MAC is equal to the right-hand side of equation (26), and F=1.4 and $T_{bd}$=8 work well, although different values may be used.

Referring to FIGS. 8A and 8B, in this embodiment the processor 88 implements a filter that is different from the averaging filter discussed above in conjunction with FIGS. 7A and 7B. More specifically, the processor 88 implements a filter that operates on the values of the four pixels adjacent to a boundary, two pixels on either side of the boundary. For example, referring to FIG. 8A, where two pixels hp0 and hp1 of a first block are on one side of a vertical boundary 130, and two pixels hp2 and hp4 of a second block are on the other the other side of the boundary 130, the processor 88 filters the values of hp0–hp3 based on four respective functions fh0–fh3 of the pre-filtered values of hp0–hp3. Likewise, referring to FIG. 8b, where two pixels vp0 and vp1 of a first block are on one side of a horizontal boundary 132, and two pixels vp2 and vp4 of a second block are on the other the other side of the boundary 132, the processor 88 filters the values of vp0–vp3 based on four functions fv0–fv3 of the pre-filtered values of vp0–vp3.

For example, referring to FIGS. 6 and 8A, in one embodiment, if the boundary 122 is blocky, the processor 88 filters the Y values of the pixels $a_{y,6}$ for y=0,1,2,3, . . . ,7 (column 6 of block A) according to the following equation:

$$a'_{y,6} = fh0 = 0.65 a_{(y,6)pre\text{-}filtered} + 0.2 a_{(y,7)pre\text{-}filtered} + 0.1 b_{(y,0)pre\text{-}filtered} + 0.05 b_{(y,1)pre\text{-}filtered} \tag{27}$$

where $a'_{y,6}$ corresponds to the filtered Y value of the pixel hp0, i.e. hp0$_{filtered}$, and $a_{(y,6)pre\text{-}filtered}$, $a_{(y,7)pre\text{-}filtered}$, $b_{(y,0)pre\text{-}filtered}$, and $b_{(y,1)pre\text{-}filtered}$ respectively correspond to the pre-filtered Y values of the pixels hp0–hp03, i.e., hp0$_{pre\text{-}filtered}$, hp1$_{pre\text{-}filtered}$, hp2$_{pre\text{-}filtered}$, and hp3$_{pre\text{-}filtered}$ of FIG. 8A. Thus, $a'_{y,6}$ equals the filtered Y value of the pixel $a_{y,6}$.

Similarly, the processor 88 filters the values of the pixels $a_{y,7}$ (column 7 of block A), $b_{y,0}$ (column 0 of block B), and $b_{y,1}$ (column 1 of block B) for y=0,1,2, . . . ,7 according to the following equations:

$$a'_{y,7} = fh1 = 0.25 a_{(y,6)pre\text{-}filtered} + 0.35 a_{(y,7)pre\text{-}filtered} + 0.26 b_{(y,0)pre\text{-}filtered} + 0.14 b_{(y,1)pre\text{-}filtered} \quad (28)$$

$$b'_{y,0} = fh2 = 0.14 a_{(y,6)pre\text{-}filtered} + 0.26 a_{(y,7)pre\text{-}filtered} + 0.35 b_{(y,0)pre\text{-}filtered} + 0.25 b_{(y,1)pre\text{-}filtered} \quad (29)$$

$$b'_{y,1} = fh3 = 0.05 a_{(y,6)pre\text{-}filtered} + 0.1 a_{(y,7)pre\text{-}filtered} + 0.2 b_{(y,0)pre\text{-}filtered} + 0.65 b_{(y,1)pre\text{-}filtered} \quad (30)$$

where $a'_{y,7}$ corresponds to $hp1_{filtered}$, and thus equals the filtered Y value of the pixel $a_{y,7}$, $b'_{y,0}$ corresponds to $hp2_{filtered}$, and thus equals the filtered Y value of the pixel $b_{y,0}$, and $b'_{y,1}$ corresponds to $hp3_{filtered}$, and thus equals the filtered Y value of the pixel $b_{y,1}$.

Likewise, referring to FIGS. 6 and 8B, if the boundary 124 is blocky, the processor 88 filters the values of the pixels $a_{6,x}$ for x=0,1,2,3, . . . , 7 (row 6 of block A) according to the following equation:

$$a'_{6,x} = fv0 = 0.65 a_{(6,x)pre\text{-}filtered} + 0.2 a_{(7,x)pre\text{-}filtered} + 0.1 c_{(0,x)pre\text{-}filtered} + 0.05 c_{(1,x)pre\text{-}filtered} \quad (31)$$

where $a'_{6,x}$ corresponds to the filtered Y value of the pixel vp0, i.e., $Vp0_{filtered}$, and $a_{(6,x)pre\text{-}filtered}$, $a_{(7,x)pre\text{-}filtered}$, $c_{(0,x)pre\text{-}filtered}$, and $c_{(1,x)pre\text{-}filtered}$ respectively correspond to the pre-filtered Y values of the pixels vp0–vp3, i.e., $vp0_{pre\text{-}filtered}$, $vp1_{pre\text{-}filtered}$, $vp2_{pre\text{-}filtered}$, and $vp3_{pre\text{-}filtered}$, of FIG. 8B. Thus, $a'_{6,x}$ equals the filtered value of the pixel $a_{6,x}$.

Similarly, the processor 88 filters the values of the pixels $a_{7,x}$, (row 7 of block A), $c_{0,x}$, (row 0 of block C), and $c_{1,x}$, (row 1 of block C) for x=0,1,2, . . . , 7 according to the following equations:

$$a'_{7,x} = fv1 = 0.25 a_{(6,x)pre\text{-}filtered} + 0.35 a_{(7,x)pre\text{-}filtered} + 0.26 c_{(0,x)pre\text{-}filtered} + 0.14 c_{(1,x)pre\text{-}filtered} \quad (32)$$

$$c'_{0,x} = fv2 = 0.14 a_{(6,x)pre\text{-}filtered} + 0.26 a_{(7,x)pre\text{-}filtered} + 0.35 c_{(0,x)pre\text{-}filtered} + 0.25 c_{(1,x)pre\text{-}filtered} \quad (33)$$

$$c'_{1,x} = fv3 = 0.05 a_{(6,x)pre\text{-}filtered} + 0.1 a_{(7,x)pre\text{-}filtered} + 0.2 c_{(0,x)pre\text{-}filtered} + 0.65 c_{(x,1)pre\text{-}filtered} \quad (34)$$

where $a'_{7,x}$ corresponds to $vp1_{filtered}$, and thus equals the filtered Y value of the pixel $a_{7,x}$, $c'_{0,x}$ corresponds to $vp2_{filtered}$, and thus equals the filtered Y value of the pixel $c_{0,x}$, and $c'_{1,x}$ corresponds to $vp3_{filtered}$, and thus equals the filtered Y value of the pixel $c_{1,x}$.

To implement the above filtering equations, the processor 88 conventionally stores the pre-filtered values of the pixels being filtered.

From the foregoing it will be appreciated that, although specific embodiments of the invention have been described herein for purposes of illustration, various modifications may be made without deviating from the spirit and scope of the invention.

What is claimed:

1. An image processing circuit, comprising:
   a processor operable to,
      receive at least a portion of an image, the portion including a boundary, first and second contiguous pixels disposed on opposite sides of the boundary, and a third pixel, the first, second, and third pixels having respective first, second, and third pixel values;
      generate a boundary value from the first, second, and third values;
      compare the boundary value to a comparison value; and
      reduce a difference between the first and second values if the boundary value has a specified relationship to the comparison value.

2. The processing circuit of claim 1 wherein:
   the image portion includes a fourth pixel that has a fourth pixel value and that is contiguous with and located on an opposite side of the boundary from the third pixel: and
   the boundary value equals an average of the difference between the first and second values and the difference between the third and fourth values.

3. The processing circuit of claim 1 wherein:
   the image portion includes a fourth pixel that has a fourth pixel value and that is contiguous with and located on an opposite side of the boundary from the third pixel; and
   the boundary value equals the lesser of a predetermined value or an absolute value of the average of the difference between the first and second values and the difference between the third and fourth values.

4. The processing circuit of claim 1 wherein the boundary value equals a roughness value that indicates the roughness of the boundary.

5. The processing circuit of claim 1 wherein the image includes first and second contiguous pixel blocks disposed on opposite sides of the boundary, the first and second pixels respectively disposed in the first and second blocks, the third pixel disposed in the first or second block.

6. The processing circuit of claim 1 wherein the first, second, and third values of the first, second, and third-pixels comprise respective luminance values.

7. An image processing circuit, comprising:
   a storage circuit operable to store at least a portion of an image including a boundary, first and second contiguous pixels disposed on opposite sides of the boundary, third and fourth pixels disposed on the same side of the boundary as the first pixel, and fifth and sixth pixels disposed on the same side of the boundary as the second pixel, the first, second, third, fourth, fifth, and sixth pixels having respective first, second, third, fourth, fifth, and sixth pixel values; and
   a processor coupled to the storage circuit, the processor operable to generate a boundary value from the first and second values, to generate a comparison value as a function of the first, second, third, fourth, fifth, and sixth pixel values, to compare the boundary value to the comparison value, and to reduce a difference between the first and second pixels values if the boundary value is related to the comparison value in a specified manner.

8. The processing circuit of claim 7 wherein the boundary value equals the difference between the first and second values.

9. The processing circuit of claim 7 wherein the boundary value equals a roughness value that indicates the roughness of the boundary.

10. The processing circuit of claim 7 wherein the image includes first and second contiguous pixel blocks disposed on opposite sides of the boundary, the first, third, and fourth pixels disposed in the first block and the second, fifth, and sixth-pixels disposed in the second blocks.

11. The processing circuit of claim 7 wherein the first, second, third, fourth, fifth, and sixth pixel values comprise respective luminance values.

12. The image processing circuit of claim 7 wherein:
   the image portion further includes a seventh pixel disposed on the same side of the boundary as the first pixel and an eighth pixel disposed on the same side of the boundary as the second pixel, the seventh and eighth pixels respectively having seventh and eighth pixel values;

the first and third pixels are contiguous in a dimension that is perpendicular to the boundary;

the fourth and seventh pixels are contiguous in the dimension;

the second and fifth pixels are contiguous in the dimension;

the sixth and eighth pixels are continuous in the dimension; and the processor is operable to generate the comparison value as a function of,
the average of the difference between the first and third pixel values and the difference between the fourth and seventh pixel values, and
the average of the difference between the second and fifth pixel values and the difference between the sixth and eighth pixel values.

13. The image processing circuit of claim 7 wherein the third, fourth, fifth, and sixth pixels are spaced from the boundary.

14. An image processing circuit, comprising:
a storage circuit operable to store at least a portion of an image, the portion including a boundary and first and second contiguous pixel blocks disposed on opposite sides of the boundary, each block including pixels arranged in alignments and orthogonal alignments and having respective values, each pixel in a first alignment of the first block being contiguous with a respective pixel in a first alignment of the second block, the first alignments of the first and second blocks each including at least two respective pixels; and
a processor coupled to the storage circuit, the processor operable to generate a boundary value from the values of all of the pixels in the first alignments of the first and second blocks, to compare the boundary value to a comparison value, and to reduce a difference between the value of a first pixel in the first alignment of the first block and the value of a respective first pixel in the first alignment of the second block if the boundary value has a specified relationship to the comparison value.

15. The processing circuit of claim 14 wherein the pixel alignments of the first and second blocks each comprise a respective column of pixels and the orthogonal pixel alignments of the first and second blocks each comprise a respective row of pixels.

16. The processing circuit of claim 14 wherein the pixel alignments of the first and second blocks each comprise a respective row of pixels and the orthogonal pixel alignments of the first and second blocks each comprise a respective column of pixels.

17. A processing circuit, comprising:
a storage circuit operable to store at least a portion of an image, the portion including a boundary and first and second contiguous pixel blocks located on opposite sides of the boundary, the first and second blocks each including respective first and second alignments of at least two pixels having respective values, each pixel in the first alignment of the first block being contiguous with a respective pixel in the first alignment of the second block; and
a processor coupled to the storage circuit, the processor operable to generate a boundary value from the values of the pixels in the first alignments of the first and second blocks, to generate a comparison value as a function of the values of all the pixels in the first and second alignments of the first block and in the first and second alignments of the second block, to compare the boundary value to the comparison value, and to reduce a difference between the value of a first pixel in the first alignment of the first block and the value of a respective first pixel in the first alignment of the second block if the boundary value has a specified relationship to the comparison value.

18. The processing circuit of claim 17 wherein the first and second alignments of the first block and the first and second alignments of the second block each comprise a respective row of pixels.

19. The processing circuit of claim 17 wherein the first and second alignments of the first block and the first and second alignments of the second block each comprise a respective column of pixels.

20. The processing circuit of claim 17 wherein the image comprises a video image.

21. The processing circuit of claim 17 wherein the image comprises a still image.

22. A method, comprising:
calculating a boundary value from a first value of a first pixel, a second value of a second pixel, and a third value of a third pixel, the first and second pixels being contiguous with one another and located on opposite sides of a boundary;
comparing the boundary value to a comparison value; and
reducing a difference between the first and second values if the boundary value is related to the comparison value in a specified manner.

23. The method of claim 22 wherein calculating the boundary value comprises setting the boundary value equal to an absolute value of an average of the difference between the first and second values and the difference between the third value and a fourth value of a fourth pixel, the third and fourth pixels being contiguous and disposed on opposite sides of the boundary.

24. The method of claim 22 wherein calculating the boundary value comprises setting the boundary value equal to the lesser of a predetermined value or an absolute value of an average of the difference between the first and second values and the difference between the third value and a fourth value of a fourth pixel, the third and fourth pixels being contiguous and disposed on opposite sides of the boundary.

25. A method, comprising:
calculating a boundary value from the values of all the pixels in first and second alignments of an image, the first and second alignments located on opposite sides of a boundary and each including at least two respective pixels, each pixel in the first alignment being contiguous with a respective pixel in the second alignment;
comparing the boundary value to a comparison value; and
reducing a difference between the value of a first pixel in the first alignment and the value of a respective second pixel in the second alignment if the boundary value has a specified relationship to the comparison value.

26. The method of claim 25 wherein the alignments and orthogonal alignments of the first and second blocks comprise respective rows and columns of pixels.

27. The method of claim 25 wherein the alignments and orthogonal alignments of the first and second blocks comprise respective columns and rows of pixels.

28. The method of claim 25 wherein the values of the first and second pixels comprise respective luminance values.

29. An image processing circuit, comprising:
a processor operable to,
  receive at least a portion of an image, the portion including a predetermined boundary and first and second contiguous pixels disposed on opposite sides of the boundary and third and fourth contiguous pixels disposed on opposite sides of the boundary, the first, second, third, and fourth pixels having respective first, second, third, and fourth pixel values;
  determine whether the boundary is blocky as a function of the first, second, third, and fourth pixel values; and
  reduce a difference between the first and second pixel values and a difference between the third and fourth pixel values if and only if the boundary is blocky.

30. A method, comprising:
determining whether a predetermined boundary between first and second contiguous pixels and between third and fourth contiguous pixels is blocky using the values of the first, second, third, and fourth pixels; and
reducing a difference between the first and second values and reducing a difference between the third and fourth values if and only if the boundary is blocky.

31. An image processing circuit, comprising:
a processor operable to,
  receive at least a portion of a decoded image, the portion including a boundary between first and second contiguous pixels; and
  calculate a roughness of the boundary as a function of quantization during encoding of an image, the encoding producing an encoded image that is later decoded into the decoded image.

32. A method, comprising:
identifying a boundary between contiguous pixels of a decoded image; and
calculating a roughness of the boundary as a function of quantization that is performed during encoding of an image, the encoding producing an encoded image that is later decoded into the decoded image.

33. An image processing circuit, comprising:
a processor operable to,
  receive at least a portion of an image that has been decoded using a block-based decoding algorithm, the portion including a boundary and first and second contiguous decoded pixel blocks disposed on opposite sides of the boundary, the first pixel block having a first alignment of pixels and the second pixel block having a second alignment of pixels that is contiguous with the first alignment, the pixels within the first and second alignments having respective pixel values;
  determine whether the boundary is blocky as a function of an average difference between the value of each pixel in the first alignment and the value of a respective contiguous pixel in the second alignment; and
  reduce a difference between the first and second pixel values if and only if the boundary is blocky.

34. A method, comprising:
for a boundary between first and second contiguous pixel blocks that have been decoded according to a block-based decompression standard, the first pixel block having a first alignment of pixels and the second pixel block having a second alignment of pixels that is contiguous with the first alignment, the pixels within the first and second alignments having respective pixel values, determining whether the boundary is blocky as a function of an average difference between the value of each pixel in the first alignment and the value of a respective contiguous pixel in the second alignment; and
reducing a difference between the first and second values if and only if the boundary is blocky.

35. A method, comprising:
determining whether a boundary between contiguous first and second pixel blocks is blocky, the pixel blocks having been decoded according to a block-based decompression standard, the first pixel block having a first pixel and the second pixel block having a second pixel that is contiguous with the first pixel, the first and second pixels having respective first and second values;
reducing a difference between the first and second values if and only if the boundary is blocky;
wherein the first pixel block includes a first orthogonal alignment of pixels that includes the first pixel;
wherein the second pixel block includes a second orthogonal alignment of pixels that includes the second pixel and that is contiguous with the first orthogonal alignment; and
wherein the processor is operable to determine whether the boundary is blocky by,
  calculating a boundary roughness equal to the average difference between the values of contiguous pairs of pixels in the first and second alignments,
  calculating a first-block average pixel difference equal to the sum of the differences from the first block divided by the number of differences from the first block,
  calculating a second-block average pixel difference equal to the sum of the differences from the second block divided by the number of differences from the second block,
  calculating a first-block average pixel value equal to the sum of the values of the pixels in the first block divided by the number of pixels in the first block,
  calculating a second-block average pixel value equal to the sum of the values of the pixels in the second block divided by the number of pixels in the second block,
  calculating a comparison value equal to the sum of the product of a first factor and the sum of the first- and second-block average pixel differences and the product of a second factor and the sum of the first- and second-block average pixel values, and
  determining that the boundary is blocky if the boundary roughness has a predetermined relationship to the comparison value.

36. A method, comprising:
determining whether a boundary between contiguous first and second pixel blocks is blocky, the pixel blocks having been decoded according to a block-based decompression standard, the first pixel block having a first pixel and the second pixel block having a second pixel that is contiguous with the first pixel, the first and second pixels having respective first and second values;
reducing a difference between the first and second values if and only if the boundary is blocky;
wherein the first pixel block includes a first orthogonal alignment of pixels that includes the first pixel and a second orthogonal alignment of pixels that is contiguous with the first alignment;
wherein the second pixel block includes a third orthogonal alignment of pixels that includes the second pixel and that is contiguous with the first orthogonal alignment, and a fourth orthogonal alignment of pixels that is contiguous with the third alignment; and wherein the processor is operable to determine whether the boundary is blocky by, calculating a boundary roughness equal to the minimum of a first predetermined value and the average difference between the values of contiguous pairs of pixels in the first and third alignments, calculating a first-block average pixel difference equal to the sum of the differences between the values of the corresponding pixels in the first and second alignments divided by the number of differences from the first and second alignments, calculating a second-block average pixel difference equal to the sum of the differences between the values of the corresponding pixels in the third and fourth alignments divided by the number of differences from the third and fourth alignments, calculating a comparison value equal to the sum of a second predetermined value and the product of a first factor and the maximum of the first-block pixel average and the second-block pixel average, and determining that the boundary is blocky if the boundary roughness has a predetermined relationship to the comparison value.

\* \* \* \* \*

UNITED STATES PATENT AND TRADEMARK OFFICE
CERTIFICATE OF CORRECTION

PATENT NO. : 6,690,838 B2
DATED : February 10, 2004
INVENTOR(S) : Qinggang Zhou

It is certified that error appears in the above-identified patent and that said Letters Patent is hereby corrected as shown below:

Column 18,
Line 61, please delete "blocks" and insert -- block --.

Signed and Sealed this

Seventh Day of September, 2004

JON W. DUDAS
*Director of the United States Patent and Trademark Office*